Patented Oct. 5, 1954

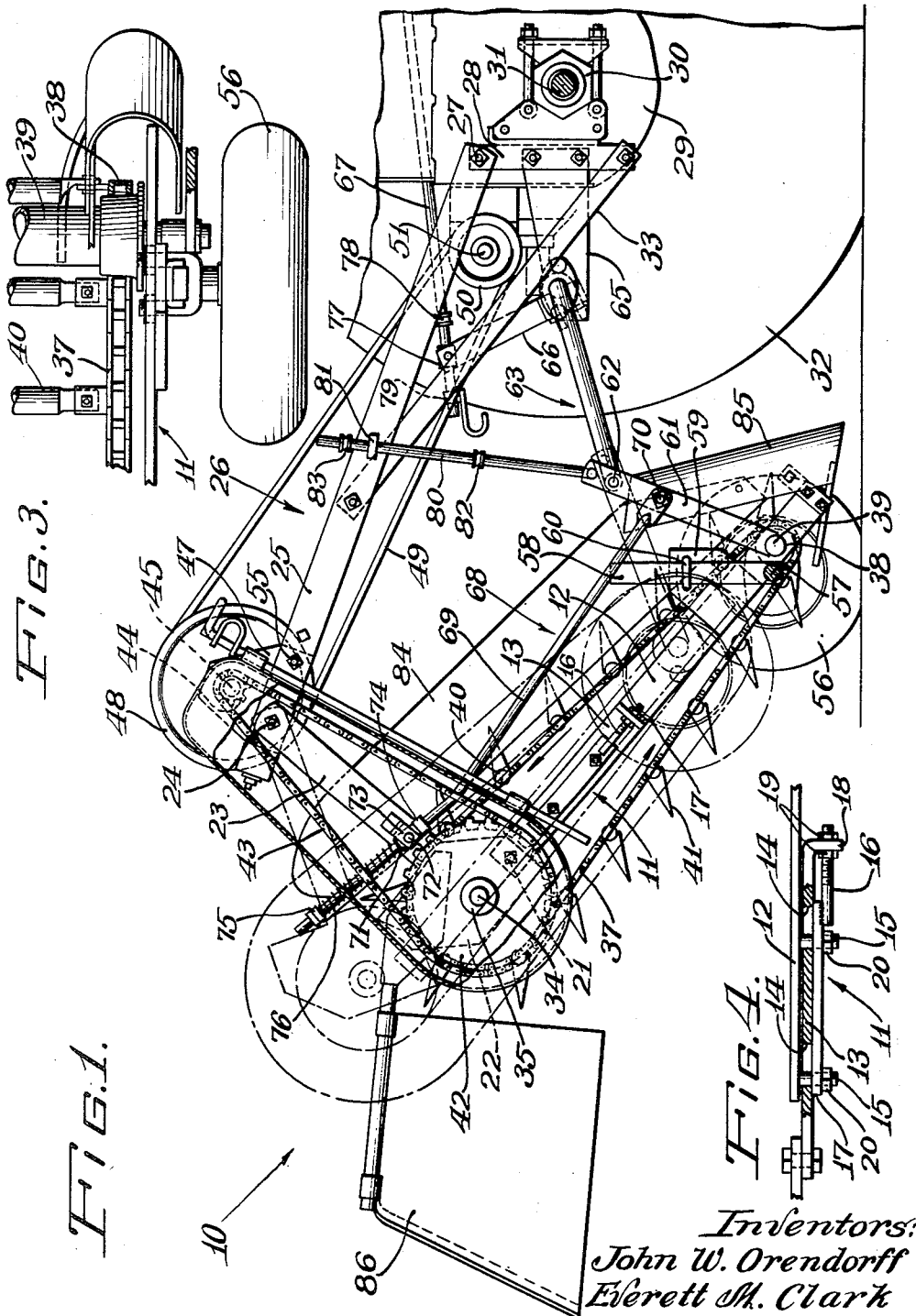

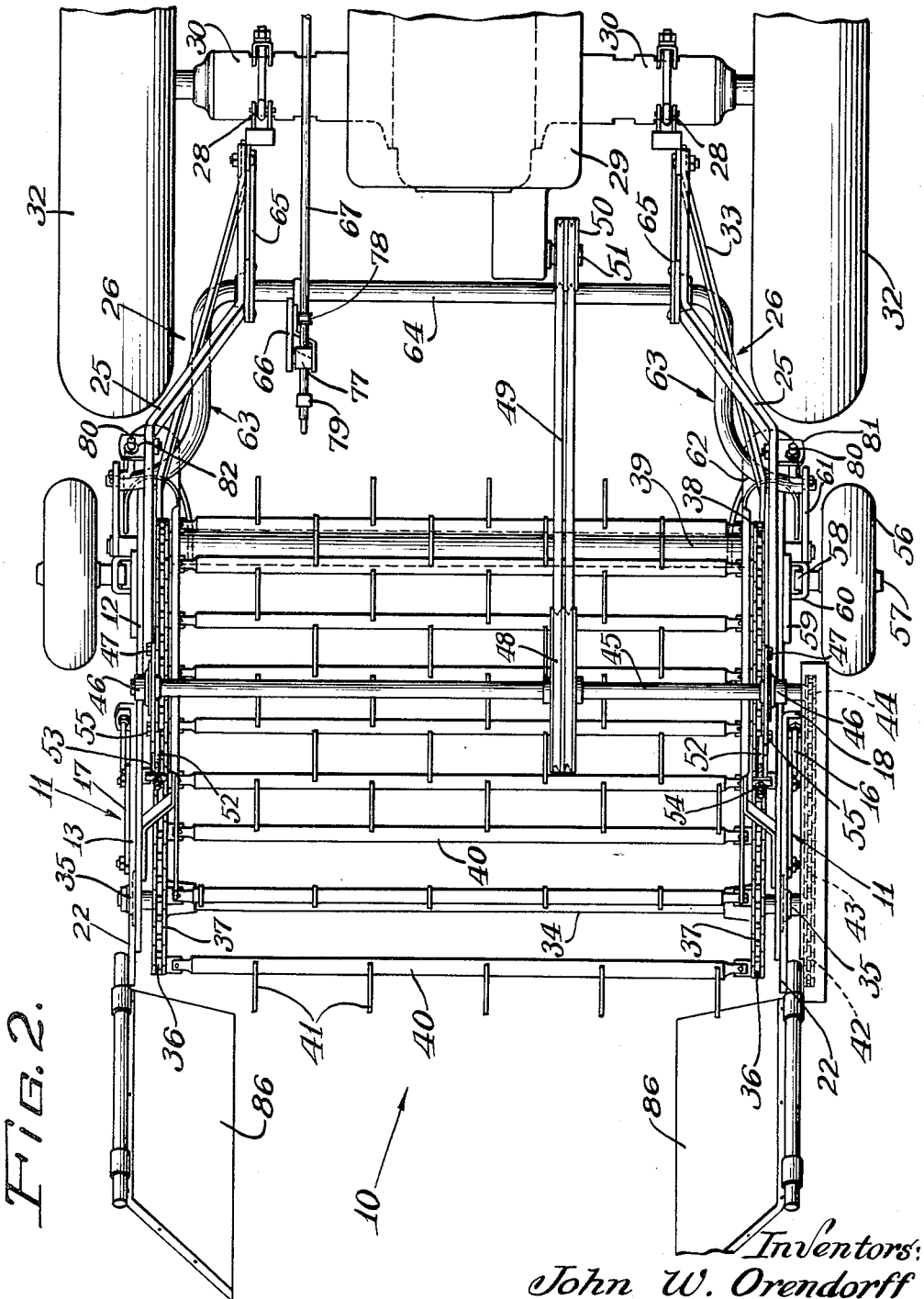

2,690,640

UNITED STATES PATENT OFFICE 2,690,640

PEANUT HARVESTER

John W. Orendorff, Canton, Ill., and Everett M. Clark, Richmond, Ind., assignors to International Harvester Company, a corporation of New Jersey Application May 20, 1952, Serial No. 288,918

20 Claims. (Cl. 56—372)

This invention relates to agricultural implements and particularly to crop harvesters. More specifically the invention concerns peanut harvesting machinery.

In the harvesting of peanuts it is customary with tractor-propelled machinery to penetrate the earth with digging mechanism below the roots of the plant to lift it from the ground. Later on the peanut vines carrying the peanuts may be collected, shaken and stacked until dry. The present mechanism concerns a machine for picking up the vines with the peanuts thereon after they have been dug and conveying and shaking the vines to dislodge dirt and debris clinging thereto. The vines are then dropped upon the ground to be later picked up and arranged in stacks.

An object of the present invention is to provide improved mechanism for picking up and shaking peanut vines which have been removed from the soil.

Another object of the invention is to provide an improved peanut conveyor and shaker mounted upon a tractor to be transported thereon.

Another object of the invention is to provide an improved means for mounting a peanut shaker or like conveyor mechanism upon a tractor for vertical floating movement with respect thereto and wherein the entire conveyor and shaker unit is capable of translational movement away from the direction of travel of the propelling vehicle and also upwardly to avoid damage thereto when obstructions are encountered.

Other objects and advantages of the invention will become clear after a consideration of the following detailed description when read in conjunction with the accompanying drawings, wherein:

Fig. 1 is a view in side elevation and partly in section of the rear end of a tractor having mounted thereupon a peanut shaker unit incorporating the features of this invention;

Fig. 2 is a plan view of the structure shown in Fig. 1 with parts removed for clarity;

Fig. 3 is an enlarged detail partly in section of a part of the shaker structure; and Fig. 4 is a sectional detail showing a part of the framework of the shaker conveyor.

With reference to the drawings it will be noted that the crop pickup and shaker mechanism of this invention is designated generally by the numeral 10 and includes laterally spaced parallel side frame bars 11, each of which comprises a pair of strap members 12 and 13. In Fig. 4 it will be observed that strap 13 has slots 14 formed therein at spaced locations to receive bolts 15 so that the longitudinal spacing or rather the length of the side frame bars 11 may be varied within the limits provided by slots 14. The straps 13 and 14 are adjusted and held adjustably in position by a bolt 16 having its shank affixed as by welding to one end of a plate 17 apertured at spaced locations to receive the bolts 15. One end of the bolt 16 is threaded for reception in an opening formed in an ear 18 at the end of the strap 13. Nuts 19 are provided on the threaded portion of the bolt 16 at opposite sides of the ear 18 and nuts 20 are provided on the bolts 15 to secure the strap members and the plate 17 together. It may be understood that the construction of the frame members 11 at each side of the conveyor is substantially identical.

The rear end of each frame bar 11 is connected by a pivot pin 21 to an irregularly shaped plate 22, which in turn is affixed to the lower end of a supporting hanger or link 23. The laterally spaced links 23 extend forwardly and upwardly from the rear ends of bars 11 and are mounted at their upper ends upon transverse pivot pins 24 carried at the rear ends of laterally spaced supporting beams 25 of a tractor-mounted supporting structure generally designated at 26.

The forward ends of the beams 25 converge and are secured at 27 to the upper end of laterally spaced brackets 28 which are mounted upon opposite sides of a tractor body 29 upon rear axle housings 30 supporting an axle 31 upon which are mounted tractor drive wheels 32. Each of the beams 25 is braced by a cross member 33 attached to the beam and to the lower end of the bracket 28.

Suspended from the hangers or links 23, and carried by the frame bars 11, is the conveyor mechanism of this combination pickup and shaking conveyor mechanism which includes an upper transversely extending conveyor shaft 34 having its opposite ends rotatably mounted in bearings 35 carried by the plates 22. Mounted upon the shaft 34 adjacent the ends thereof are large sprocket wheels 36 each of which is drivingly connected by a conveyor chain 37 with a smaller sprocket wheel 38 secured to a transversely extending shaft 39 rotatably mounted at its ends in the forward lower ends of the frame bars 11. Conveyor chains 37 are connected at spaced locations by transverse conveyor bars 40 each of which is provided with a plurality of laterally spaced radially projecting fingers 41 and it may be observed that the chains are adapted to travel in the direction of the arrows in Fig. 1.

The conveyor is driven by mechanism which includes another sprocket wheel 42 mounted upon the right hand end of the conveyor shaft 34 beyond the sprocket wheel 36 and drivingly connected by a chain 43 with a sprocket wheel 44 mounted upon a transversely extending shaft 45 rotatably mounted in bearings 46 carried at the upper ends of plates 47 affixed to the rear ends of the beams 25. There is also mounted upon the shaft 45 a sheave 48 connected by a belt pulley 49 with another sheave 50 mounted upon a power take-off shaft 51 of the tractor. The tension on the pulley and sheave assembly 48, 59, 50 may be adjusted by mechanism comprising a bolt 52 welded at one end to the plate 47 and threaded at its other end for reception in a lug 53 secured to the strap member 12, one at each side of the conveyor assembly. A nut 54 is provided on each side of the lug 53 whereby the bolt 52 may be extended or retracted. The plates 47 are secured to the beams 25 by bolts 55 carried by the beams and receivable in suitable slotted openings in the plate 47. The tension on the belt 49 may thus be adjusted by loosening the bolts 55 and adjusting the position of the bolt 52.

Since the conveyor and shaker assembly 10 is relatively wide and extends for some distance back of the rear end of the tractor, it is essential that for proper weight distribution purposes it be carried as close to the tractor as possible while avoiding contact with the tractor parts, particularly the drive wheels, during vertical movement of the implement in operation or when moved between operating and transport positions. At this point, therefore, it should be clear that by virtue of the suspension of the shaker and conveyor assembly from the supporting beams 25 through the intermediary of hangers 23 which extend downwardly and rearwardly as indicated in Fig. 1, the assembly is capable of longitudinal swinging movement about the pivot 24 of the hangers 23 on the beams 25. Were this motion not impeded, of course, it should be clear that the assembly 10 would swing forwardly into contact with the tractor parts. However, as pointed out before it is important that the implement be kept to the rear of the tractor at all times and entirely out of contact therewith while still retaining the capacity for vertical floating movement to follow the contour of the ground and to avoid injury upon contact with obstructions. The foregoing is achieved by novel mechanism including a ground-supporting wheel 56 at the forward lower end of the shaker and conveyor assembly to serve as a support therefor and maintain the lower end of the shaker in a position with the teeth 41 above the ground. In this position and with the conveyor moving in the direction of the arrows indicated in Fig. 1 the peanut vines are lifted by the fingers 41 from the ground, deposited on the conveyor, elevated to the upper end thereof and deposited upon the ground. Each of the wheels 56 is mounted upon a stub axle 57 secured to the lower end of a standard 58 adjustably affixed to a plate 59 mounted upon the frame bar 11 by means of a U bolt 60. Mounted on the outer end of the shaft 39 at the lower forward end of the conveyor is an upwardly and forwardly extending hanger or link 61, the upper end of which is apertured to rotatably receive the transversely bent portion 62 of a rock arm 63 one of which is provided at each end of a transversely extending rock shaft 64 rockably mounted in brackets 65, one at each side of the tractor body and connected at their forward ends to the attaching brackets 28. A lift arm 66 is affixed to the transverse rock shaft 64 and is connected by a rod 67 with suitable power transmission mechanism, not shown, on the tractor and deriving power from the tractor power plant for longitudinally moving the rod 67 to rock the shaft 64 and the arm 66 to raise and lower the implement.

The conveyor and shaker assembly is prevented from swinging forwardly about the pivots 24 and 62 of the hangers 23 and 61, respectively, from the downwardly and rearwardly extending positions indicated in Fig. 1, by a stop mechanism 68 which comprises a rod 69 pivotally connected at its forward end by a pin 70 to the hanger 61 medially of its ends. Rod 69 extends rearwardly and is slidably received in a swivel 71 mounted on trunnions 72 between a clip 73 and the hanger 23, it being understood that a stop member 68 is provided at each side of the shaker and conveyor assembly. An adjustable set collar 74 on the rod 69 abuts the swivel 71 in the position shown in Fig. 1 and limits forward swinging of the shaker and conveyor unit beyond the position shown. The stop member can thus be adjusted by varying the position of collar 74. Rearward and upward swinging of the conveyor bodily is accommodated, however, as indicated in dotted lines in Fig. 1, and this occurs when resistance is encountered by the lower forward end of the unit and allows the shaker assembly to rise up and over obstructions. The swivel 71 thus slides over the rod 69 during rearward movement of the assembly and its rearward movement is limited by the provision of one or more collars 75 at the rear end of the rod 69. A spring 76 surrounds the rod between the collar 75 and the swivel 71 to resiliently resist rearward movement of the assembly and to urge it back to its operating position.

The stop member 68 occupies a position somewhat in parallelism with the frame bar 11 and forming roughly a parallelogram therewith and with the links 23 and 61, and when the swivel 71 is in engagement with the collar 74 the assembly is locked against forward swinging beyond the position shown. It might be noted also that the lever arm represented by the distance between the trunnions 72 and the pivot 74 is longer than the lever arm represented by the distance between the pivots 62 and 70. The former lever arm, therefore, moves faster and as the assembly swings rearwardly it also swings upwardly. Likewise, when the obstruction encountered has been passed the hangers 23 and 61 again swing forwardly until the swivel 71 engages the collar 74.

Vertical floating of the forward end of the assembly on the supporting wheels 56 is accommodated by the fact that the rod 67 is slidably received in a swivel 77 mounted at the end of lift arm 66. Collars 78 and 79 on the rod 67 at opposite sides of the swivel 77 provide lost motion accommodating limited movement of the arm 66 relative to the rod 67. This permits limited floating movement of the front end of the conveyor in a generally vertical direction. A guide rod 80 has its lower end pivotally connected to the upper end of the link 61 and its upper end is received in the opening of an eye bolt 81 carried by the supporting beam 25, it being understood that a guide rod 80 is provided at each side of the shaker assembly. Collars 82 and 83 limit the movement of the rod 80 in the eye of the bolt 81 and collar 83 serves as a stop to limit the downward movement of the front end of the shaker assembly.

In Fig. 1 it is clearly shown that the sprocket wheels 38 at the forward lower end of the conveyor and about which the chains 37 are trained, are considerably smaller than the sprocket wheels 42 at the upper rearward end of the conveyor assembly. This construction facilitates somewhat the handling of the peanut vines in that they are picked up by the teeth 41, which it will be noted are not perpendicular to the surface of the conveyor but at an angle thereto, and are deposited on the surface of the conveyor for elevation. As the vines reach the rear end of the conveyor having a larger diameter the teeth 41 move somewhat faster and throw the vines rearwardly and downwardly, inhibiting any tendency thereof to cling to the conveyor and follow around again.

Conventional laterally spaced shields 84 extending the length of the shaker assembly confine the peanut vines to the shaker conveyor as they are elevated and to the forward ends of these shields are attached vine dividers 85. Vines discharged from the rear end of the shaker assembly are guided into a windrow by laterally spaced guide members 86 which are secured to the plates 22.

From the foregoing the operation of the peanut harvester of this invention should be clear. It should likewise be understood that the invention has been described in its preferred embodiment only and that modifications may be made therein without departing from the spirit thereof or the scope of the appended claims.

What is claimed is:

1. Crop treating apparatus for attachment to a source of propelling power comprising a supporting structure, an endless crop treating conveyor extending at an angle upwardly and rearwardly, ground-engaging wheels supporting the forward lower end of the conveyor, laterally spaced supporting links suspended from said supporting structure, said links being pivoted respectively to the support and to the rear end of the conveyor on vertically spaced transverse axes to accommodate translational swinging of the conveyor generally longitudinally about the pivots of said links on the support and upward swinging about the pivots of the links on the conveyor, and stop means operatively associated with the links and conveyor limiting the swinging of the conveyor about the pivots of said supporting links on the supporting structure.

2. Crop treating apparatus for attachment to a source of propelling power comprising a supporting structure, an endless crop treating conveyor extending at an angle upwardly and rearwardly, ground-engaging wheels supporting the forward lower end of the conveyor, laterally spaced supporting links suspended from said supporting structure, said links being pivoted respectively to the support and to the rear end of the conveyor on vertically spaced transverse axes to accommodate translational swinging of the conveyor generally longitudinally about the pivots of said links on the support and upward swinging about the pivots of the links on the conveyor, stop means operatively associated with said links and conveyor limiting the swinging of the conveyor about the pivots of said links on the supporting structure, and lift means mounted on the supporting structure connected to the forward end of the conveyor for raising and lowering the latter about the pivotal connection of the rear end of the conveyor on said supporting links.

3. Crop treating apparatus according to claim 1 wherein lost motion is provided in the connection of the lift means to the forward end of the conveyor to accommodate free floating movement of the front end of the conveyor in the operating position thereof about its pivotal connection to said supporting links.

4. Crop treating apparatus for attachment to a source of propelling power comprising a supporting structure, an endless crop treating conveyor extending at an angle upwardly and rearwardly, ground-engaging wheels supporting the forward lower end of the conveyor, laterally spaced supporting links suspended from said supporting structure, said links being pivoted respectively to the support and to the rear end of the conveyor on vertically spaced transverse axes to accommodate translational swinging of the conveyor generally longitudinally about the pivots of said links on the support and upward swinging about the pivots of the links on the conveyor, and lift means mounted on the supporting structure connected to the forward end of the conveyor for raising and lowering the latter about the pivotal connection of the rear end of the conveyor on said supporting links, the connection of said lift means to the conveyor including a lifting link pivotally connected to the conveyor and to said lift means, and stop means operatively associated with the links and conveyor preventing forward swinging of the conveyor about the pivots of said supporting links on the supporting structure.

5. Crop treating apparatus according to claim 4, wherein the stop means comprises a thrust member generally parallel to the conveyor and pivotally connected to said lifting link and to said supporting link, said thrust member having a slidable connection with one of said links to accommodate rearward swinging of the conveyor when obstructions are encountered by the forward end thereof.

6. Crop treating apparatus according to claim 4, wherein the stop means comprises a thrust member generally parallel to the conveyor and pivotally connected to said lifting link and to said supporting link, said thrust member having a slidable connection with one of said links to accommodate rearward swinging of the conveyor when obstructions are encountered by the forward end thereof, and forming a rigid parallelogram with said conveyor to prevent forward swinging thereof about the pivots of said supporting links on the supporting structure.

7. An implement attachment for a vehicle comprising supporting means mounted on the vehicle, link means pivotally suspended from said supporting means for longitudinal swinging of the lower end thereof, an implement pivotally connected to and supported from the lower end of said link means, said implement being longitudinally swingable about the pivot of said link means on the support forwardly and rearwardly of a normal operating position, and stop means operatively associated with the link means and implement acting upon said link means and effective to prevent forward swinging of the implement forwardly of said normal operating position but accommodating rearward swinging thereof when resistance to forward motion is encountered by the implement.

8. An implement attachment for a vehicle comprising supporting means mounted on the vehicle, longitudinally spaced generally parallel links pivotally suspended from said supporting means, an implement pivotally connected to and supported from the lower ends of said links, said links extending at an angle rearwardly of a vertical line through their pivot axes in the normal operating position of the implement, said links being swingable bodily rearwardly when resistance to forward motion is encountered by the implement, and an adjustable stop operatively associated with the links and implement acting upon said links to prevent forward swinging of the implement beyond said normal operating position.

9. For use with a harvester for peanuts and the like adapted for mounting upon a vehicle having power transmission means thereon, a vine shaker unit comprising a carrying frame attached at its forward end to the vehicle and extending rearwardly therefrom, laterally spaced supports depending from the rear end of said frame and pivotally connected thereto for longitudinal swinging about a transverse axis, a shaker comprising laterally spaced longitudinally extending side members pivotally connected to the lower ends of the respective of said supports for vertical swinging and extending forwardly therefrom toward the vehicle, a transverse shaker drive shaft between the rear ends of said supports, a transverse driven shaft between the forward ends of said side members and endless conveyor means including pickup elements drivingly connecting said shafts, a standard pivotally mounted on the forward end of the shaker on a transverse axis and extending upwardly therefrom, a lift arm mounted on the tractor and pivotally connected to the upper end of said standard on a transverse axis, said lift arm and therefore the forward end of the shaker having floating movement relative to the vehicle during operation of the shaker but vertically movable to raise and lower the front end of the shaker about the pivots of said side members on said supports, said shaker, upon encountering an obstruction, being translatorily movable rearwardly and upwardly about the pivots of the standard on the lift arm and of the support on the carrying frame.

10. For use with a harvester for peanuts and the like adapted for mounting upon a vehicle having power transmission means thereon, a vine shaker unit comprising a carrying frame attached at its forward end to the vehicle and extending rearwardly therefrom, laterally spaced supports depending from the rear end of said frame and pivotally connected thereto for longitudinal swinging about a transverse axis, a shaker comprising laterally spaced longitudinally extending side members pivotally connected to the lower ends of the respective of said supports for vertical swinging and extending forwardly therefrom toward the vehicle, a transverse shaker drive shaft between the rear ends of said supports, a transverse driven shaft between the forward ends of said side members and endless conveyor means including pickup elements drivingly connecting said shafts, a standard pivotally mounted on the forward end of the shaker on a transverse axis and extending upwardly therefrom, a lift arm mounted on the tractor and pivotally connected to the upper end of said standard on a transverse axis, said lift arm and therefore the forward end of the shaker having floating movement relative to the vehicle during operation of the shaker but vertically movable to raise and lower the front end of the shaker about the pivots of said side members on said supports, said shaker, upon encountering an obstruction, being translatorily movable rearwardly and upwardly about the pivots of the standard on the lift arm and of the support on the carrying frame, a main drive shaft on the carrying frame and driven from said tractor power transmission means, and means drivingly connecting the main shaft to the shaker drive shaft, said main drive shaft being parallel to and adjacent the pivot axis of said supports on the carrying frame, whereby the effect of said translatory movement of the shaker relative to the carrying frame upon the driving connection between said shafts is minimized.

11. For use with a harvester for peanuts and the like adapted for mounting upon a vehicle, an upwardly and rearwardly inclined conveyor, a carrying frame on the vehicle, supporting link means depending from said frame and pivotally connected thereto and to the rear end of the conveyor to provide support therefor, ground-engaging wheels supporting the forward end of the conveyor for free floating movement, generally vertically movable lift means on the support, a lift link depending from said lift means and pivotally connected thereto and to the forward end of the conveyor for raising and lowering the latter about its pivotal connection to the supporting link, and a thrust member pivotally connecting said lift link to said supporting link; said latter connection being slidable to accommodate rearward swinging of the conveyor bodily relative to the vehicle.

12. A harvesting attachment for a tractor comprising a carrying frame secured to the tractor and extending rearwardly therefrom, an endless conveyor arranged at an angle rearwardly and upwardly with its forward lower end in crop-engaging position, means for suspending the conveyor from said carrying frame including a supporting link extending downwardly and rearwardly and pivotally connected to said frame and to the rear end of said conveyor, a vertically movable lift arm carried by the tractor, a lift link pivotally connected to the lift arm and extending at an angle downwardly and rearwardly for pivotal connection to the forward end of the conveyor and means operatively associated with the supporting link and the conveyor for locking the conveyor against forward swinging about the pivotal connections of said links to the carrying frame and the lift arm, respectively.

13. A harvesting attachment for a tractor comprising a carrying frame secured to the tractor and extending rearwardly therefrom, an endless conveyor arranged at an angle rearwardly and upwardly with its forward lower end in crop-engaging position, means for suspending the conveyor from said carrying frame including a supporting link extending downwardly and rearwardly and pivotally connected to said frame and to the rear end of said conveyor, a vertically movable lift arm carried by the tractor, a lift link pivotally connected to the lift arm and extending at an angle downwardly and rearwardly for pivotal connection to the forward end of the conveyor, and means operatively associated with the supporting link and the conveyor for locking the conveyor against forward swinging about the pivotal connections of said links to the carrying frame and the lift arm, respectively, said locking means including means accommodating rearward and upward movement of the conveyor when abnormal resistance is encountered to the forward motion thereof.

14. A harvesting attachment for a tractor comprising a carrying frame secured to the tractor and extending rearwardly therefrom, an endless conveyor arranged at an angle rearwardly and upwardly with its forward lower end in crop-engaging position, means for suspending the conveyor from said carrying frame including a supporting link extending downwardly and rearwardly and pivotally connected to said frame and to the rear end of said conveyor to accommodate longitudinal movement thereof, a vertically movable lift arm carried by the tractor, a lift link pivotally connected to the lift arm and extending at an angle downwardly and rearwardly for pivotal connection to the forward end of the conveyor to accommodate said longitudinal movement thereof, and means for locking the conveyor against forward swinging about the pivotal connections of said links to the carrying frame and the lift arm, respectively, said locking means including a connecting member pivotally connected to one of said links and having a sliding connection with a part on the other of said links, and a stop on said connecting member operatively engageable with said part arranged to prevent forward swinging of the conveyor but to accommodate rearward and upward movement thereof when abnormal resistance is encountered.

15. A harvesting attachment according to claim 12, wherein a spring is provided on said connecting member operatively engageable with said part to yieldably resist rearward swinging of the conveyor.

16. A harvesting attachment for a tractor comprising a carrying frame secured to the tractor and extending rearwardly therefrom, an endless conveyor arranged at an angle rearwardly and upwardly with its forward lower end in crop-engaging positions, means for suspending the conveyor from said carrying frame including a supporting link extending downwardly and rearwardly and pivotally connected to said frame and to the rear end of said conveyor, a vertically movable lift arm carried by the tractor, a lift link pivotally connected to the lift arm and extending at an angle downwardly and rearwardly for pivotal connection to the forward end of the conveyor, a ground-engaging support for the forward end of the conveyor, and means operatively associated with the links and conveyor for maintaining the rearward inclination of said links while accommodating floating movement of the forward end of the conveyor on said ground support in accordance with variations in ground contour.

17. A harvesting attachment for a tractor comprising a carrying frame secured to the tractor and extending rearwardly therefrom, an endless conveyor arranged at an angle rearwardly and upwardly with its forward lower end in crop-engaging position, means for suspending the conveyor from said carrying frame including a supporting link extending downwardly and rearwardly and pivotally connected to said frame and to the rear end of said conveyor, a vertically movable lift arm carried by the tractor, a lift link pivotally connected to the lift arm and extending at an angle downwardly and rearwardly for pivotal connection to the forward end of the conveyor, a ground-engaging support for the forward end of the conveyor, and means for maintaining the rearward inclination of said links while accommodating floating movement of the forward end of the conveyor on said ground support in accordance with variations in ground contour, said last mentioned means comprising a thrust rod pivotally connected to said lift link and to said supporting link above the connections thereof to the conveyor, the connection of the rod to one of said links being slidable, and a stop on the rod engageable with the latter link to limit sliding of said rod in one direction.

18. A crop harvesting attachment for a tractor comprising a supporting structure mounted on the tractor, an endless crop-gathering conveyor positioned at an angle with respect to the ground having side frame members and a ground-engaging supporting member at its forward lower end, means for carrying the conveyor from its supporting structure for bodily movement thereof rearwardly at an angle corresponding generally to its angular position relative to the ground including longitudinally spaced links operatively connected to the supporting structure for longitudinal swinging about transverse axes, and a connecting member generally parallel to said conveyor frame members and connecting said links, said connecting member having a slidable connection with one of said links and a stop thereon to limit forward swinging of the conveyor about the pivots of said links on the supporting structure.

19. A crop harvesting attachment for a tractor comprising a supporting structure mounted on the tractor, an endless crop-gathering conveyor positioned at an angle with respect to the ground having side frame members and a ground-engaging supporting member at its forward lower end, means for carrying the conveyor from its supporting structure for bodily movement thereof rearwardly at an angle corresponding generally to its angular position relative to the ground including longitudinally spaced links operatively connected to the supporting structure for longitudinal swinging about transverse axes, a vertically swingable lifting member forming a part of said supporting structure to which the forwardmost of said links is pivotally connected, and a connecting member generally parallel to said conveyor frame members and connecting said links, said connecting member having a slidable connection with one of said links and a stop thereon to limit forward swinging of the conveyor about the pivots of said links on the supporting structure.

20. A crop harvesting attachment according to claim 16, wherein said lifting member is mounted on the supporting structure for limited free vertical movement to accommodate floating of the forward end of the conveyor in its operating position about the pivot thereof on the rearmost of said links.

References Cited in the file of this patent

UNITED STATES PATENTS

| Number | Name | Date |
|---|---|---|
| 748,532 | Rosenaw | Dec. 29, 1903 |
| 1,790,447 | Siegenthaler | Jan. 27, 1931 |
| 2,489,834 | Tisdale et al. | Nov. 29, 1949 |
| 2,502,599 | Smart | Apr. 4, 1950 |
| 2,507,635 | James | May 16, 1950 |
| 2,517,413 | Pearson | Aug. 1, 1950 |
| 2,539,834 | Hatton | Jan. 30, 1951 |